Sept. 25, 1923.
W. D. BOST ET AL
1,468,873
APPARATUS FOR PEELING FRUITS AND VEGETABLES
Original Filed Aug. 20, 1919    7 Sheets-Sheet 5
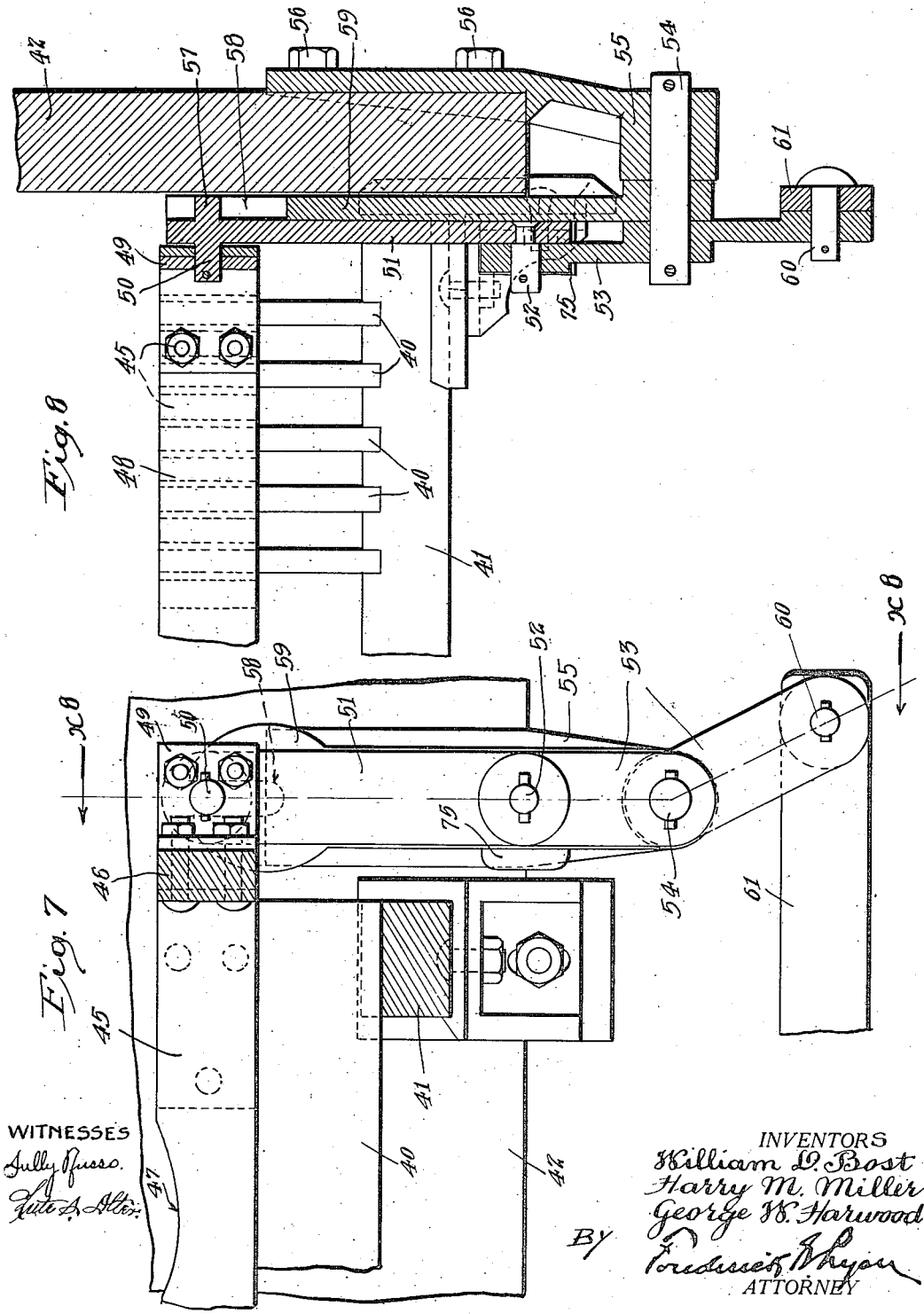

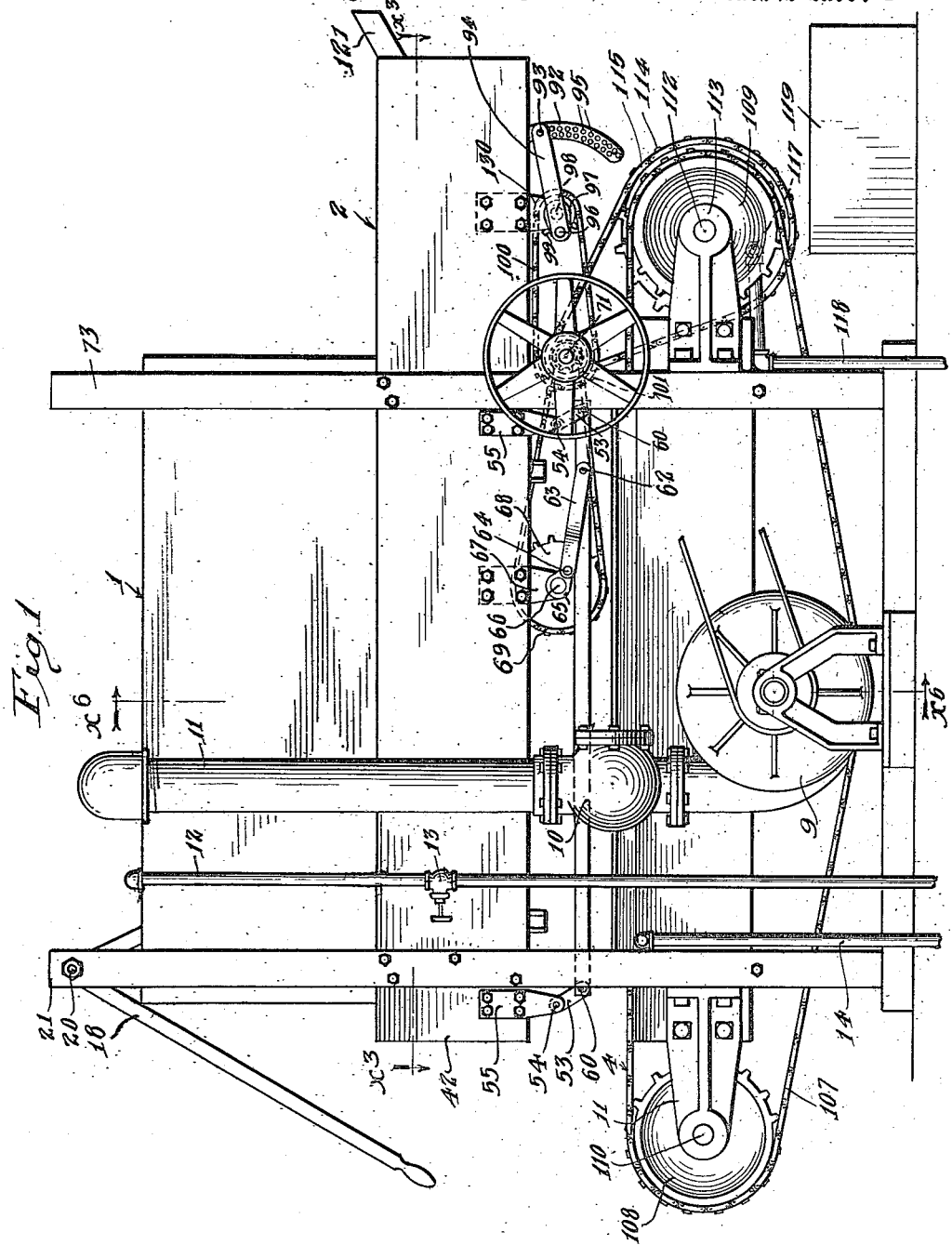

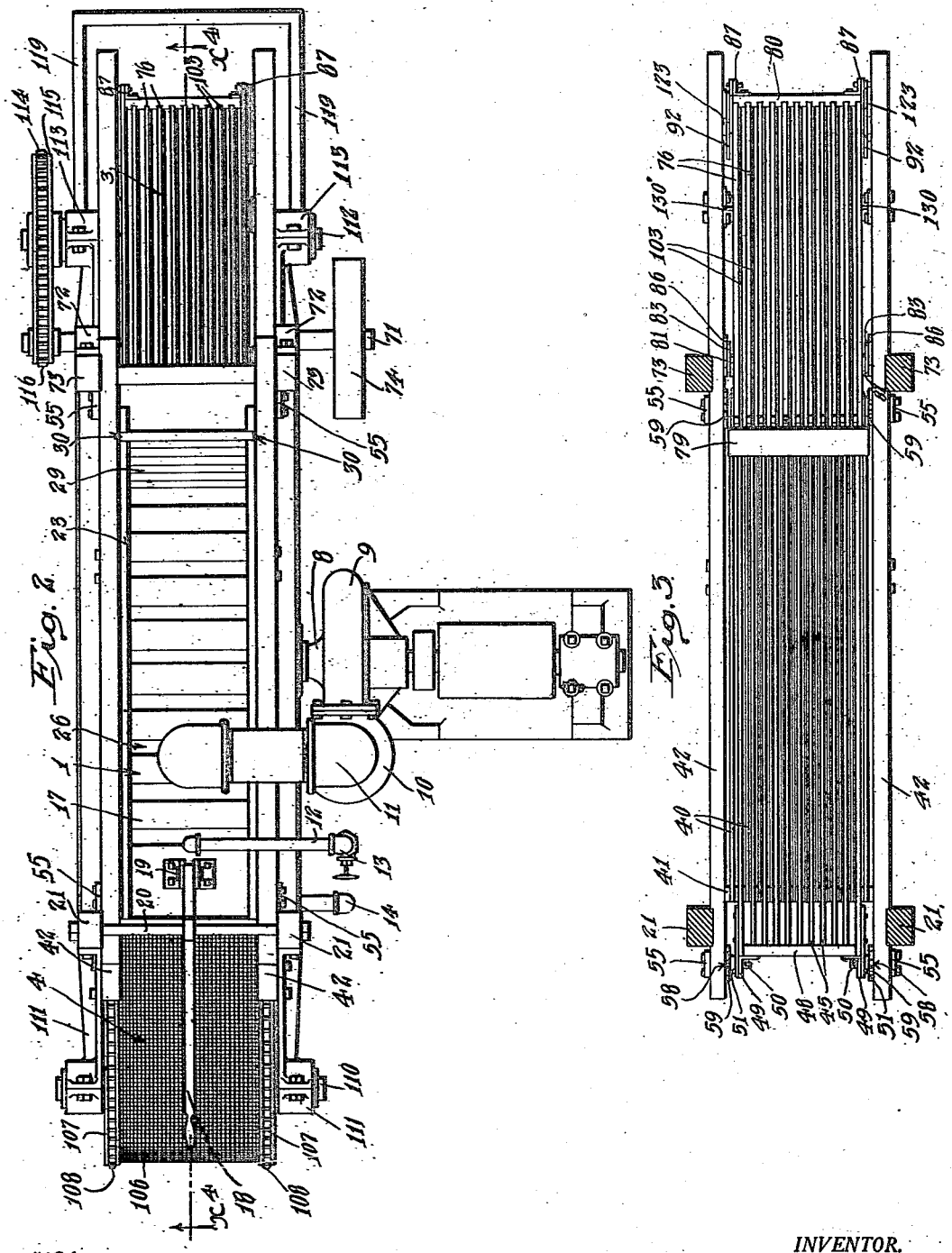

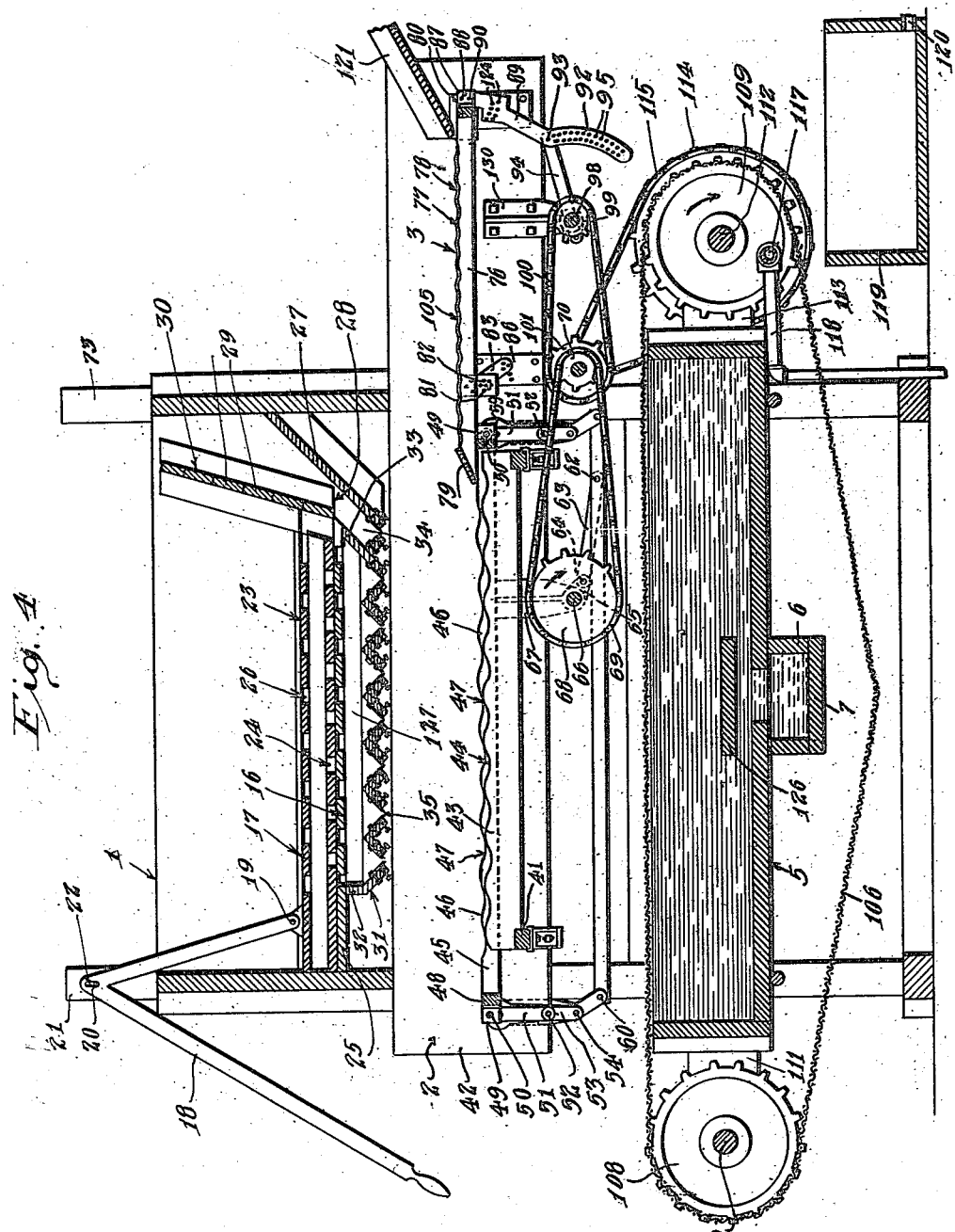

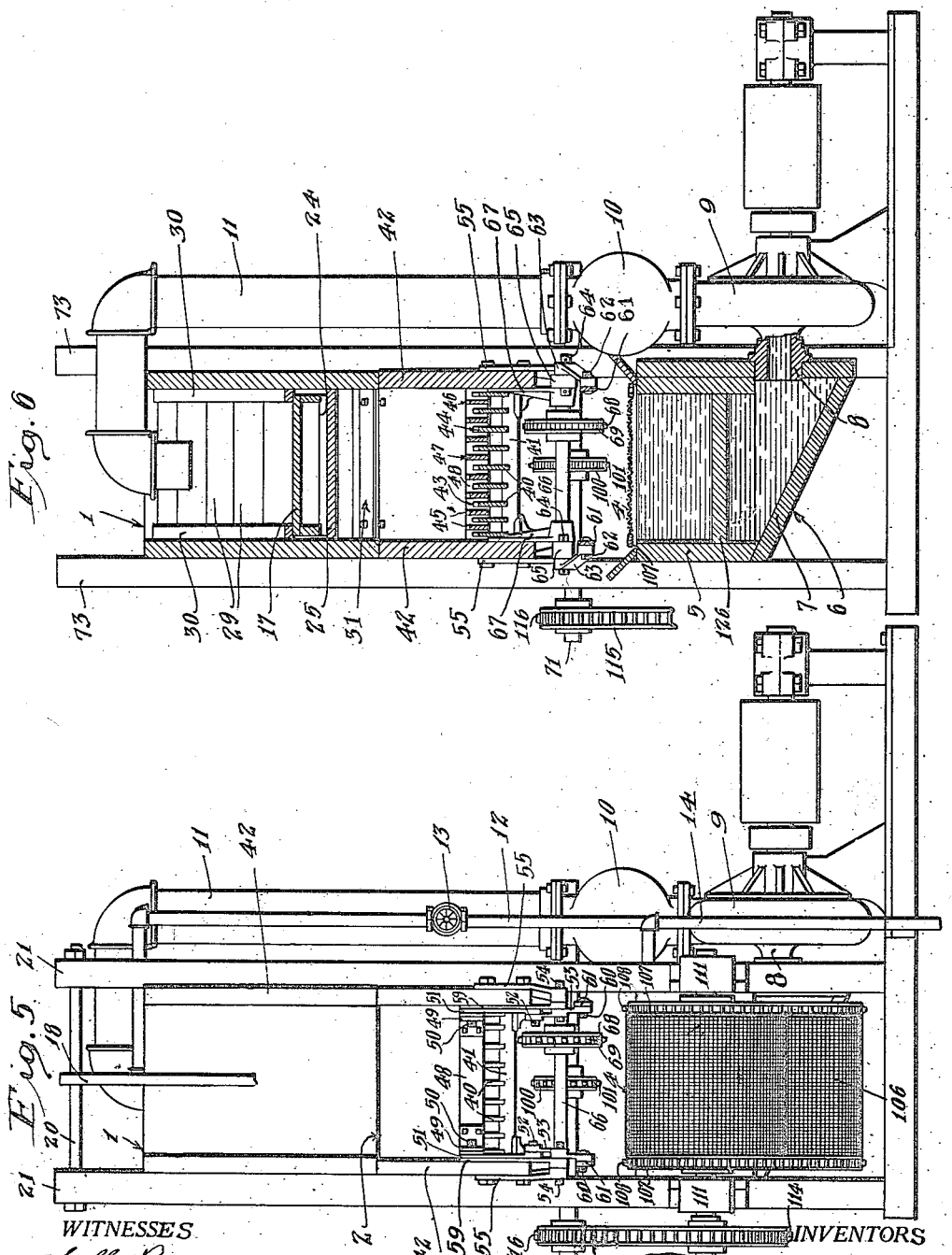

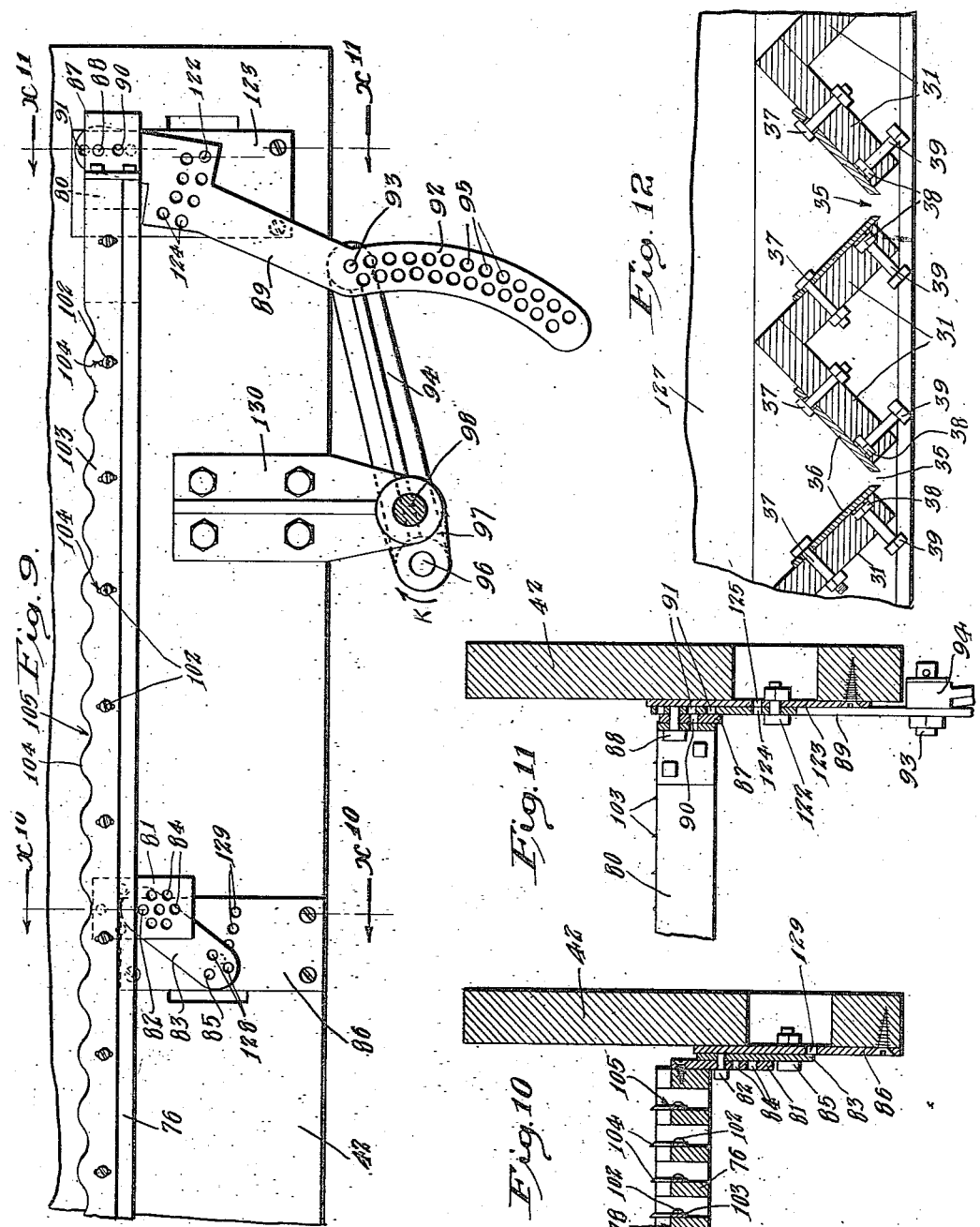

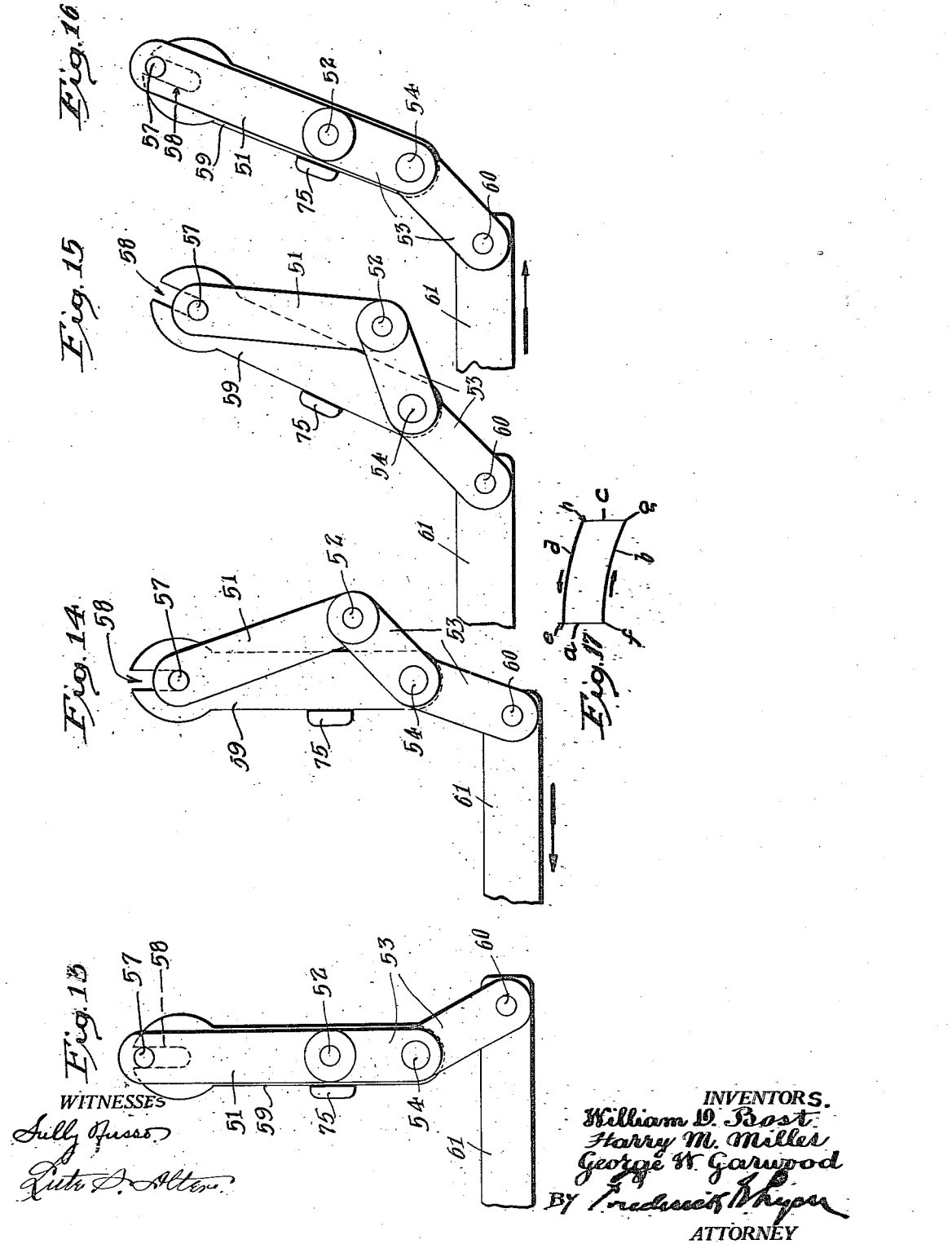

Patented Sept. 25, 1923.

1,468,873

UNITED STATES PATENT OFFICE.

WILLIAM D. BOST, OF LOS ANGELES, HARRY M. MILLER, OF SOUTH PASADENA, AND GEORGE W. GARWOOD, OF EL MONTE, CALIFORNIA, ASSIGNORS, BY DIRECT AND MESNE ASSIGNMENTS, TO NATIONAL PEELING MACHINE COMPANY, OF LOS ANGELES, CALIFORNIA, A CORPORATION OF CALIFORNIA.

APPARATUS FOR PEELING FRUITS AND VEGETABLES.

Application filed August 20, 1919, Serial No. 318,639. Renewed July 9, 1923.

*To all whom it may concern:*

Be it known that we, WILLIAM D. BOST, HARRY M. MILLER, and GEORGE W. GARWOOD, citizens of the United States, said MILLER residing at South Pasadena, county of Los Angeles, and State of California, and said BOST residing at Los Angeles, county of Los Angeles, and State of California, and said GARWOOD residing at El Monte, county of Los Angeles, and State of California, have invented a new and useful Apparatus for Peeling Fruits and Vegetables, of which the following is a specification.

This invention relates to an apparatus for peeling tomatoes and other vegetables and fruits, and an object of the invention is to provide an apparatus by which the skins of the fruits and vegetables are punctured or perforated and the skins after being perforated are flushed off of the pulp bodies.

Another object is to provide an apparatus of this character in which the fruits or vegetables are turned after the skins are perforated, and streams of water are caused to play on the turning fruit.

Another object is to provide a construction which will insure to a maximum degree the removal of the skins from the pulp bodies of the fruits and vegetables without injury to said bodies.

Another object is to make provision for perforating, gashing or slitting the skins of fruit or vegetables while turning them, so that the skins will be cut around the entire fruit body.

Another object is to carry the fruit in a step by step motion and turn it while streams of water are falling on the fruit bodies.

Another object is to perform the operations of slitting the skins and conveying and turning the fruit without injury to the fruit bodies.

Other objects and advantages will appear in the subjoined detail description.

The accompanying drawings illustrate an apparatus embodying the invention:

Figure 1 is a side elevation of an apparatus built in accordance with the provisions of this invention.

Fig. 2 is a plan view of Fig. 1.

Fig. 3 is a plan view from line indicated by $x^3$—$x^3$, Fig. 1, the parts below the upper conveyor and perforating or slitting mechanism being omitted.

Fig. 4 is a sectional elevation on line indicated by $x^4$—$x^4$, Fig. 2.

Fig. 5 is an end elevation from the left of Fig. 1.

Fig. 6 is an elevation mainly in section on line indicated by $x^6$—$x^6$, Fig. 1, the pump and its discharge piping being shown in full and one of the sprocket wheels and a portion of a sprocket chain being broken away to contract the view.

Fig. 7 is an enlarged detail of a portion of the upper conveyor operating mechanism.

Fig. 8 is a sectional elevation on line indicated by $x^8$—$x^8$, Fig. 7.

Fig. 9 is an enlarged detail of the knife-actuating mechanism.

Fig. 10 is a sectional elevation on line indicated by $x^{10}$—$x^{10}$, Fig. 9.

Fig. 11 is a sectional elevation on line indicated by $x^{11}$—$x^{11}$, Fig. 9.

Fig. 12 is an enlarged sectional detail of some of the water discharging nozzles.

Figs. 13, 14, 15 and 16 are more or less diagrammatic views illustrating four different positions of some of the parts of the operating mechanism of the upper conveyor.

Fig. 17 is a diagrammatic view illustrating the path of movement of any point on any one of the conveyor strips.

Hereinafter, to make this specification as concise as possible, the term "fruit" will be employed exclusively to signify or define not only fruits commonly designated by that term but also vegetables, it being understood that the term "fruit" defines any fruit or vegetable having a skin or peel that can be removed by the operations of the machine.

There are provided a water-distributing tank 1, a conveyor 2 beneath the tank 1, perforating, puncturing, cutting or slitting mechanism 3 at one end of the conveyor 2, a conveyor and separator 4 beneath the conveyor 2, and a tank 5 beneath the upper run of the conveyor 4 and above the lower run of said conveyor. The tank 5 has a sump 6 near its middle portion, the bottom 7 of said sump being aslant toward one side of the tank. Connected to the sump 6 is the intake 8 of a pump indicated in general by the character 9, the discharge 10 of said pump being connected to the piping 11 which discharges into the tank 1. Over the sump is a deflecting plate 126 which prevents too strong a suction effect on the water immediately over the sump. The tank 1 may be initially filled by a water supply pipe 12 provided with a valve 13; and the tank 5 is provided with an overflow pipe 14.

The bottom of the tank 1 is provided lengthwise thereof with a series of ports 16 which are controlled by a sliding valve 17. Suitable means are provided for operating the valve 17 and, in this particular instance, for this purpose a bell-crank lever 18 is pivoted at 19 to the valve, the fulcrum of the lever 18 being formed by a pivot 20 projecting from a standard 21 of the tank 1. The pivot 20 projects through a slot 22 in the lever 18 so as to allow for change of distance between the pivots 19, 20 when the lever is moved to operate the valve. The valve 17 slides in ways 23 and is provided with a series of lower ports 24 adapted to cooperate with the ports 16 to allow liquid to flow from the interior of the valve to the space beneath the bottom 25 of the tank 1. The valve 17 is also provided with upper ports 26 and these ports are in staggered relation to the ports 24 so that water flowing through the ports 26 will not descend in vertical columns or currents to the ports 24 but will be spread and distributed before reaching the ports 24. Thus the valve 17 insures evenness of distribution of the water that flows therethrough. The ports 15, 24, 26 are in the form of elongate slots.

The tank bottom 25 is spaced at one end from a downwardly and inwardly slanting end member 27 of the tank 1 so as to form a port 28 therebetween, and at said end of the bottom 25 there is provided a level-regulating gate comprising any desired number of gate strips 29 shiftably mounted in ways 30 at the sides of the tank 1. One or more of the strips 29 may be removed so that the level to which the water will rise in the tank 1 will be lowered, thus to regulate the head or force of the water flowing through the ports 16. When the valve 17 is not open sufficiently to discharge water as rapidly as it is admitted through the pipe 12, the surplus volume will flow over the uppermost strip 29 and discharge through the port 28. Beneath the tank bottom 25 is provided a series of nozzle members 31 spaced from the bottom 25. The nozzle members 31 with the exception of the endmost ones are arranged in inverted V-shaped pairs which are spaced slightly from one another and from the endmost nozzle members, the lower end of the member 27 forming one of the nozzle members and the nozzle member at the opposite end being connected by an end wall 32 with the bottom 25. Another wall 33 extends from the bottom 25 to one of the nozzle members 31 so as to form a passage 34 communicating with the port 28. The space between the nozzle members and bottom 25 is further enclosed by side walls 127.

The water passes from the space immediately over the nozzle members 31 through the nozzle openings 35 formed by the slot-like spaces between adjacent nozzle members. Means are provided to adjust the size of the nozzle openings and for this purpose each nozzle member 31 is provided on its upper face with a plate 36 secured near its upper margin by bolts 37 to the associated member 31. Countersunk in the upper face of each of the members 31, beneath the associated plate 36, are nuts 38 and into each nut 38 is screw-threaded an adjusting screw 39 extending through the member 31, the upper ends of the screws 39 bearing against the under face of the associated plate 36. By loosening the bolts 37 and screwing the screws 39 inwardly the lower edges of adjacent plates 36 may be caused to approach one another so as to reduce the size of the opening between them, thus to diminish the thickness of the sheets of water adapted to discharge through the nozzle openings 35. When the plates 36 have been thus adjusted, the bolts 37 will be tightened up so as to securely hold said plates in the adjusted positions. It is to be noted that the ports 16 are not positioned immediately over the nozzle openings 35 but are in staggered relation thereto, said ports being positioned over the apex of the inverted V-shaped members formed by the respective pairs of associated nozzle members.

The conveyor 2 will now be described. Arranged transversely of the nozzle openings 35 and beneath said openings is a series of spaced slats or strips 40 which are mounted at their ends on cross members 41 that are connected at their ends to side members 42 of the conveyor 2. The upper edges of the slats 40 form alternatively arranged humps and depressions 43, 44 which together produce wave-like or scalloped supporting surfaces. Between each two adjacent slats 40, and spaced therefrom, are movable slats or strips 45. The upper edges of the slats 45 form alternatively arranged humps and depressions 46, 47 so as to produce wave like or scalloped supporting surfaces the same as the slats 40.

The slats 45 are connected at their ends to transversely extending cross bars 48 that are provided at their ends with bearings 49 in which are journaled pivots 50 projecting from arms 51 respectively. The arms 51 are pivoted at 52 to oscillating levers 53 which in turn are pivoted at 54 to bearings 55 fastened by bolts 56 to the lower margins of the conveyor sides 42. The parts 50 to 55 inclusive, just described, are arranged in pairs, there being a pair connected to each of the cross bars 48. Each of the arms 51 is provided with a pin 57 and each pin 57 engages a slot 58 in an arm 59. The arms 59 are journaled at their lower ends on the pins 54, respectively, between the levers 53, and bearings 55. One of each pair of the levers 53 is pivoted at 60 to opposite ends of a connecting rod 61 and each connecting rod is pivoted at 62 to a link 63 which is pivoted at 64 to a crank 65 on a shaft 66 that is journaled in bearings 67 fastened to the conveyor sides 42. The shaft 66 is provided with a sprocket wheel 68 driven by a sprocket chain 69 which in turn is driven by a sprocket wheel 70 mounted on a shaft 71 journaled in bearings 72 that are fastened to two of the standards 73 which support the tanks 1, 5 and conveyor 2. The shaft 71 is provided at one end with a pulley 74 which may be belted to a motor so as to produce the desired operation of the slats 45.

The arms 59 are provided with lugs forming stops 75 adapted to be engaged by the lower ends of the arms 51 when the pivots 52, 54, 57 are substantially in vertical alinement with one another as in Fig. 7, so that the joint 52 of the toggle devices, formed by the arms 51 and levers 53, cannot break toward the left in Fig. 7 but only toward the right. Assuming that the parts of the mechanism just described for moving the slats 45 are in the positions shown in Fig. 13, the path of movement described by the pivot 57 and also by any given point on any of the slats 45 is shown diagrammatically in Fig. 17 of the drawings, said path of movement consisting of four limbs, a vertical movement downwardly indicated by the line $a$, a downwardly curved longitudinal movement indicated by the line $b$, a vertical upward movement indicated by the line $c$, and an upwardly curved longitudinal movement indicated by the line $d$. In Fig. 4 of the drawings the discharge end of the conveyor 2 is at the left and the intake end of the right, and the direction of motion $b$ is from the discharge end toward the intake end, and the direction of motion $d$ is from the intake end toward the discharge end. Thus it is clear that the slats 45 in their forward movement will be in their uppermost positions and that said slats in their rearward motion will be at the lower portion of their movement. When the parts are in the positions shown in Fig. 13, the bottom of any one of the depressions 47 will be at the point $e$ in Fig. 17; when the parts are in the positions shown in Fig. 14 said bottom will be at the point $f$; when the parts are in the positions indicated in Fig. 15 the bottom of the depression will be at the point $g$; and when the parts are in the positions indicated in Fig. 16 the bottom of the depression will be at the point $h$. When the bottoms of the depressions are at the point $e$ said bottoms will be slightly above the level of the tips of the humps 43, and the centers of the depressions 47 will be slightly to the left of the centers of the humps 43 so that tomatoes or other fruit which may be on the slats 45 will be deposited slightly to the left of the centers of the humps 43 when the slats 45 make the movement $a$, thus allowing said tomatoes to roll forwardly down the humps into the depressions 44. This rolling movement of the tomatoes of course turns the tomatoes so as to expose other portions thereof to the water discharging from the nozzle openings 35.

The fruit discharges onto the conveyor 2 from the perforating or cutting mechanism 3 which will now be described: There is provided a series of longitudinally extending spaced strips 76 on which the fruit can roll. The upper edges of the strips 76 are scalloped, the humps of the scallops being indicated at 77 and the depressions at 78. This produces wave-like supporting surfaces for the tomatoes to travel on. The strips 76 are connected together at their discharge ends by a cross bar 79 and at their intake ends by a cross bar 80. The outermost strip 76 at each side is provided with a downwardly projecting ear 81. The ears 81 are pivoted at 82 to arms 83, there being a plurality of holes 84 in the ears 81 so that the pivots 82 can be selectively engaged with the holes 84 in order to provide for relative adjustment between the ears 81 and arms 83, thus providing for change of angular movement of the arms 83. The arms 83 are pivoted at 85 to plates 86 mounted on the inner faces of the members 42, the arms 83 and plates 86 being provided with a plurality of holes 128, 129 so that the pivot 85 can be selectively engaged with said holes in order to produce relative adjustment between the arms 83 and the members 42, thus providing for change of angular movement of the arms 83. Since the arms 83 are disposed at an angle to the vertical, it is clear that the direction of motion of the discharge ends of the strips 76 can be altered by changing in the pivot 85 into different positions in the arms 83 or plates 86, and that by changing the position of the pivots 82 in the ears 81 the slant of the strips 76 can be altered.

The cross bar 80 is provided at its ends with bearings 87 which are supported by pivots 88 projecting from oscillating levers 89, there being a plurality of holes 90, 91 in the bearings 87 and levers 89, respectively, so that the pivots 88 can be selectively engaged with said holes to change the adjustment of the intake ends of the strips 76 relative to the levers 89, thus providing for change of slant of the strips 76.

The levers 89 are pivoted at 122 to plates 123 fastened to the inner faces of the conveyor side walls 42, there being duplicate series of holes 124, 125 in the levers 89 and plates 123, respectively, so that by selectively engaging the pivot with the holes the length of stroke of the strips 76 and knives 103 can be increased and decreased. The levers 89 at their lower portions form sectors 92 which are pivoted at 93 to pitmen 94. The pivots 93 can be selectively engaged with any one of a number of holes 95 in the sectors 92 so as to change the throw of the arms 89, thus providing for change of length of stroke of the strips 76. The pitmen 94 are pivoted at 96 to cranks 97 on a shaft 98 which rotate in bearings 130 fastened to the sides 42. The centers of the holes 95 are equal distances from the axes of the pivots 96 so that change of position of the pivots 93 in the sectors 92 will not change the angular relation of the arms 69 relative to the strips 76. The shaft 98 is provided with a sprocket wheel 99 driven by a sprocket chain 100 which in turn is driven by a sprocket wheel 101 mounted on the shaft 71, thus providing for operation of the strips 76.

Rotation of the cranks 97 in the direction of the arrow k in Fig. 9, assuming that the parts are in the position shown in said figure, causes the rear ends of the strips 76 to be thrust first upwardly and forwardly and then downwardly and rearwardly. Adjustably fastened along one side of the strips 76 by screws 102, or their equivalents, are knives 103, said knives having slots 104 to accommodate the screws 102 so that the knives can be raised or lowered relative to the strips 76. The knives 103 are scalloped the same as the strips 76, the humps of the scallops being indicated at 104 and the depressions at 105. Thus the knives have wavelike upper edges. The knives 103 are adjusted to project sufficiently above the level of the strips 76 so that said knives will cut through the skins of the fruit but not an appreciable depth into the pulp bodies of the fruit. Whether the fruit engages the humps 104 or the depressions 105 of the knives, it is clear that the knives will function to puncture, perforate, cut, or slit the skins of the fruit, the motion given to the knives by actuation of the strips causing even the relatively tough skins of tomatoes to be perforated or cut. It is clear from the foregoing that, when the rear ends of the knives are raised, the fruit will tend to roll toward the discharge end of the knives and that the movement of the knives will tend to intermittently advance the fruit from the intake ends of the knives toward the discharge ends thereof while at the same time producing perforating or slits in the skins of the fruit.

The conveyor 4, in this instance, is constructed as follows: An endless perforate or foraminous belt or apron 106 constructed of wire screen or other suitable material is fastened at its margins to endless sprocket chains 107 which are rove around sprockets 108, 109. The sprockets 108 are mounted on a shaft 110 journaled in bearings 111 fastened to one end of the tank 5. The sprockets 109 are mounted on a shaft 112 journaled in bearings 113 fastened to the other end of the tank 5. The shaft 112 is also provided with another sprocket wheel 114 driven by a sprocket chain 115 which in turn is driven by a sprocket wheel 116 mounted on the shaft 71. The upper run of the belt 106 travels over the tank 5 just above the plane on the upper edge of said tank, and the lower run of the belt 106 passes beneath the tank 6. Positioned inside of the belt 106 between the sprocket 109 is a nozzle formed of a piece of perforated pipe 117 which is connected to a fluid-supply pipe 118 adapted to supply fluid such as water, steam, or air to the nozzle 117. The nozzle 117 is positioned close to the lower run of the belt 106 substantially in line with the points on the sprocket wheels 109 where the sprocket chains leave said sprockets. Beneath the sprockets 109 is positioned a receptacle 119, having a drain outlet 120. The tomatoes or other fruit may be fed to the intake end of the knives 103 by any suitable means, such means, in this instance, comprising a chute or trough 121.

It is understood that the apparatus described above may be utilized to operate on any fruit or vegetable of a nature capable of being freed from the skins or peelings by the various operations performed by the machine. However, in order to describe the operation of the machine and the method whereby the fruit or vegetables are freed from their skins, the operation of the machine and the method will now be described in connection with the freeing of tomatoes of their skins.

The lever 18 will be operated to open the ports 16 and the valve 13, will be opened to charge the tank 1 with water. Power will be applied to drive the pump 9 so as to pump water from the tank 5 into the tank 1, and the lever 18 will be adjusted to move the valve 17 into position to open the ports 16 the desired degree. The water will pass from the tank 1 into the enclosed space above the nozzle members 31 and will be caused by said nozzle members to fall in relatively thin sheets extending transversely of the machine and also transversely of the conveyor 2. The falling water will pass between the slats 40, 45 and thence into the tank 5 and because of the pump 9 the water will be caused to circulate through the machine and can thus be used over and over.

As soon as the operator has obtained the desired volumes of the streams of water issuing through the nozzle openings 35, by manipulation of either the valve 17 or nozzle plates 36 or both, he will cause tomatoes to be fed to the chute 121. The tomatoes thus fed to the chute 121 will have first been treated with a suitable alkali or other skin-loosening agent such, for example, as sodium hydroxide. The alkali treatment loosens the skins of the tomatoes from their pulp bodies as has been described more fully in the co-pending application of William D. Bost and Harry M. Miller for patent for process of peeling tomatoes, filed November 16, 1918, Serial No. 262,886. The tomatoes thus treated pass down the chute 121 and upon the reciprocating knives 103, and by the reciprocating action of said knives the tomatoes are rolled over and over upon the strips 76 and the skins of the tomatoes are cut in numerous places by the knives. The knives can only sink into the tomatoes to a depth corresponding to the height of the upper edges of the knives above the upper edges of the strips 76. The depth of cut will be preferably just sufficient to cause the knives to cut entirely through the tomato skins. By properly adjusting the pivots 88, 122, the knives 103 may be caused to give a hacking stroke upward against the tomatoes as well as a drawing or slashing stroke so that the knives will penetrate even the toughest skins. This is very important for, as is well known, the skins of tomatoes are exceedingly leathery and tough and so smooth as to tend to resist the cutting action of a knife.

The intake ends of the knives 103 and strips 76 are caused to be intermittently elevated so that the tomatoes will be caused to roll forwardly along said knives and strips. Thus the tomatoes will be given a step by step motion forwardly toward the conveyor 2. The cross bar 79 is aslant forwardly and downwardly so that when the tomatoes reach said cross bar they roll thereover and discharge upon the slats 40, 45. The slats 45 on their upward strokes engage the under sides of the tomatoes so as to raise the tomatoes from the slats 40. To make clear the action of the slats 40, 45 upon the tomatoes it will be assumed, for example, that a given tomato on being discharged onto the conveyor 2 will roll into the nearest depressions 44 of two of the slats 40 immediately over one of the slats 45 and that said depression at the time is at point $g$ in Fig. 7. The slat 45 in moving upwardly from $g$ to $h$ in the path $c$ causes the tomato to be engaged by one of the humps 46 of said slot. The tomato will thereupon roll forwardly into the next forward depression 47 of the slat 45 and will also roll sidewise so as to partly rest in one of the depressions 47 of one of the next adjacent slats 45. The slats 45 will then be given the forward motion $d$ from $h$ to $e$, as in Fig. 17, thus carrying the tomato a step forward toward the discharge end of the conveyor 2. Upon downward motion of the slats 45 from $e$ to $f$ in the path $a$ the tomato will be lowered and will be engaged by one of the humps 43 of one of the adjacent slats 40 and the tomato will thereupon roll forwardly into the adjacent depression 44 of the slat 40 and will also roll sidewise so as to partly rest in one of the depressions 44 of one of the next adjacent slats 40. On account of the humps 43, 46 being in staggered relation, it is clear from the foregoing that when the tomato passes from the slat 45 to the slat 40 and from the slat 40 to the slat 45 the tomato will not only roll longitudinally of the conveyor 2, but will also roll toward one side or the other of said conveyor for a slight distance. Thus the tomato will advance in a step by step zigzag motion and at the same time be turned over and over in various directions so as to expose all portions of its cut surface to the sheets or streams of water falling from the nozzle openings 35. The slats 45 then travel from $f$ to $g$ in the path $b$ while the fruit is supported by the slats 40.

Water from the falling streams enters the fruit through the perforations, punctures, cuts or slits in the skins between the skins and the pulp bodies and causes the skins of the fruit to slip from the pulp bodies, the force of the streams of water being just sufficient, owing to the force of gravity on the water, to penetrate the openings in the skins or peelings so as to push the skins outwardly from the bodies and gently flush the skins from the bodies. At the discharge end of the conveyor 2 the fruit bodies denuded of their skins are removed from said conveyor or discharged therefrom into a suitable receptacle or chute, not shown. The skins thus washed or flushed off of the fruit are flushed downwardly between the adjacent slats 40, 45 and fall upon the belt or apron 106 which functions to carry the skins toward the right in Fig. 4 so as to discharge them into the receptacle 119. Some of the skins will drop from the belt 106 into the receptacle 119 without the provision of any means to force them from engagement with the belt. However, there will be a tendency for some of the pieces of skin to stick to the belt 106 and the fluid issuing from the nozzle 117 will strike the inside of the belt 106 above the particles of skin sticking to the belt and will force said particles from the belt into the receptacle 119. Air or steam may be used in the nozzle 117 or water may be employed. If steam or water is employed the condensed steam or water will drain from the receptacle 199 through the drain opening 120.

Small fragments of the skin and other foreign particles may pass through the belt 106 into the tank 5 and will tend to float at the surface of the water in the said tank. These particles pass off with some of the water through the overflow pipe 14, the pipe 12 admitting fresh water in sufficient volumes to replace the water discharging through the overflow pipe.

The method described above is not claimed herein but is the subject of the prior application of William D. Bost and Harry M. Miller, filed May 21, 1919, Ser. No. 298,595.

The invention is not limited in its broader phases to the exact details of construction described above and shown in the drawings, but the invention also includes such changes and modifications as lie within the spirit and scope of the appended claims.

We claim:

1. In an apparatus of the character described, movably mounted spaced strips, knives extending lengthwise of the strips with their cutting edges turned upwardly, and means to move the strips endwise and up and down.

2. In an apparatus of the character described, knives having their cutting edges turned upwardly, means to move the knives endwise and up and down, and means to prevent the knives penetrating more than a predetermined distance into the vegetable or fruit on the knives as the knives operate.

3. In an apparatus of the character described, movably mounted strips, knives mounted on the strips and having their cutting edges projecting above the upper faces of the strips, and means to move the strips endwise.

4. In an apparatus of the character described, movably mounted strips having their upper faces scalloped, knives mounted on the strips and scalloped to correspond with the strips and having their cutting edges projecting above the upper faces of the strips, and means to move the strips endwise.

5. In an apparatus of the character described, movable mounted strips, knives mounted on the strips and having their cutting edges projecting above the upper faces of the strips, and means to move the strips up and down.

6. In an apparatus of the character described, movably mounted strips having their upper faces scalloped, knives mounted on the strips and scalloped to correspond with the strips and having their cutting edges projecting above the upper faces of the strips, and means to move the strips up and down.

7. In an apparatus of the character described, movably mounted strips, knives mounted on the strips and having their cutting edges projecting above the upper faces of the strips, and means to move the strips endwise and up and down.

8. In an apparatus of the character described, movably mounted strips having their upper faces scalloped, knives mounted on the strips and scalloped to correspond with the strips and having their cutting edges projecting above the upper faces of the strips, and means to move the strips endwise and up and down.

9. In an apparatus of the character described, means to perforate the skins of the fruit, means to receive and turn the fruit, means to operate the skin-perforating means and the fruit-turning means, and means to discharge sheets of liquid upon the fruit on the fruit-turning means.

10. In an apparatus of the character described, means to turn the fruit and perforate the skins thereof, means to receive and turn the fruit, means to operate the skin-perforating means and the fruit-turning means, and means to discharge sheets of liquid upon the fruit on the fruit-turning means.

11. In an apparatus of the character described, means to convey the fruit, means above the conveying means to discharge liquid upon the fruit on the conveying means, a tank beneath the conveying means, a foraminous apron between the conveying means and the tank, and means to move said apron.

12. In an apparatus of the character described, means to convey the fruit, means above the conveying means to discharge liquid upon the fruit on the conveying means, a tank beneath the conveying means, means to pump liquid from the tank to the liquid-discharging means, a foraminous apron between the conveying means and the tank, and means to move said apron.

13. In apparatus of the character described, means to convey the fruit, means above the conveying means to discharge liquid upon the fruit on the conveying means, a tank beneath the conveying means, a foraminous apron between the conveying means and the tank, means to move the apron, and means to discharge a fluid stream through the apron adjacent one end thereof to dislodge particles of skin therefrom.

14. In an apparatus of the character described, means to convey the fruit, means above the conveying means to discharge liquid upon the fruit on the conveying means, a tank beneath the conveying means, an endless foraminous apron between the conveying means and the tank, means to move the apron, and means to discharge a fluid stream from the inside of the apron toward the outside thereof.

15. In an apparatus of the character described, strips, knives fastened to said strips, a pivoted lever pivotally connected with one end of the strips, means to oscillate the lever, and a pivotally mounted arm pivotally connected with said strips.

16. In an apparatus of the character described, strips, knives fastened to said strips, a pivoted lever pivotally connected with one end of the strips, a pitman connected with the lever, a crank to operate the pitman, means to turn the crank, and a pivotally mounted arm pivotally connected with said strips.

17. In an apparatus of the character described, slats, strips between the adjacent slats, pivotally mounted levers, arms pivoted to the levers and pivotally connected to the opposite ends of the strips, pivotally mounted arms having slots at their upper ends, pivots extending from the levers into said slots, stops on the last named arms to limit the movement in one direction of the first named arms when the levers are in one position, and means to move the levers to cause the first named arms to move from and toward the stops.

18. In an apparatus of the character described, a water-distributing tank having ports in its bottom, valves to control the flow of water through said ports, and means below the level of the tank to perforate the skins of fruit and convey the fruit beneath the tank.

19. In a peeling machine, the combination of a water-distributing tank having ports in its bottom, and means to move the fruit beneath the tank.

20. In a peeling machine, the combination of a water-distributing tank having ports in its bottom, means below the level of the tank to make openings in the skins of fruit, and means to move the fruit beneath the tank after the openings have been made.

21. In a peeling machine, the combination of water-distributing and discharging tank, a conveyor beneath the water-discharging tank having openings for the discharge of water therethrough, the space between the water-discharging tank and conveyor being free and unobstructed to permit the water to fall directly upon the articles on the conveyor, and means to operate the conveyor.

In testimony whereof, we have hereunto set our hands at Los Angeles, California, this 9th day of August, 1919.

WILLIAM D. BOST.
HARRY M. MILLER.
GEORGE W. GARWOOD.

In presence of—
CLARENCE B. FOSTER,
LEONARD S. LYON.